United States Patent [19]
Kandatsu

[11] Patent Number: 5,268,832
[45] Date of Patent: Dec. 7, 1993

[54] DC/AC INVERTER CONTROLLER FOR SOLAR CELL, INCLUDING MAXIMUM POWER POINT TRACKING FUNCTION

[75] Inventor: Yukio Kandatsu, Tokyo, Japan

[73] Assignee: Kabushiki Kaisha Toshiba, Tokyo, Japan

[21] Appl. No.: 893,015

[22] Filed: Jun. 3, 1992

[30] Foreign Application Priority Data

Aug. 20, 1991 [JP] Japan .................. 3-207089

[51] Int. Cl.⁵ .................. H02M 7/44; G05F 5/00
[52] U.S. Cl. .................. 363/95; 323/299; 323/906
[58] Field of Search .......... 363/95, 35, 37, 97, 363/98; 323/906, 299, 303

[56] References Cited

U.S. PATENT DOCUMENTS

| | | |
|---|---|---|
| 4,375,662 | 3/1983 | Baker .................. 363/95 |
| 4,604,567 | 8/1986 | Chetty .................. 323/299 |

Primary Examiner—Steven L. Stephan
Assistant Examiner—Adolf Berhane
Attorney, Agent, or Firm—Oblon, Spivak, McClelland, Maier & Neustadt

[57] ABSTRACT

A DC/AC inverter controlling system controls a DC/AC inverter so as to continuously output maximum AC power thereof, taking account of solar energy generated from a solar cell. The DC/AC inverter controlling system comprises: a DC/AC inverter unit for inverting DC (direct current) power derived from the solar cell power source into AC (alternating current) power to be supplied to an AC power line; a power variation judging unit for judging whether or not a variation measured during a predetermined time period and occurring in the AC power outputted from the DC/AC inverter unit, exceeds a predetermined value, thereby producing a power variation judging signal; and a power controlling unit for controlling the DC/AC inverter unit so as to reduce the power variation to substantially zero in response to the power variation judging signal, while the power variation does not exceed the predetermined value. As a result, the AC power outputted from the DC/AC inverter unit becomes a maximum value thereof.

9 Claims, 7 Drawing Sheets

DC/AC INVERTER CONTROLLER FOR SOLAR CELL, INCLUDING MAXIMUM POWER POINT TRACKING FUNCTION

BACKGROUND OF THE INVENTION

1. Field of the Invention

The present invention generally relates to a DC/AC inverter controlling system suitable for a solar cell type power supply unit. More specifically, the present invention is directed to a controlling system capable of deriving maximum AC power from a DC/AC inverter coupled to a solar cell type power source by controlling an operation point of the DC/AC inverter over a wide output voltage range, namely by a maximum power point tracking function.

2. Description of the Prior Art

Very recently, to save artificial energy obtained from the earth and also to avoid environment pollution, it becomes more and more popular to utilize so-called "natural energy sources" such as solar energy and wind energy. Various power controllers for solar cell type power supply units have been developed and are commercially available, which are described in, for instance, "Comparisons of Maximum Power Tracking Strategy of Solar Cell Output and Control Characteristics using Step up/down Chopper Circuit" written by T. Ohnishi et al., T. IEE Japan Vol. 112-D, No. 3, 1992, and Japanese Patent Publication No. 61-2202 published on Jan. 23, 1986.

FIG. 1 represents a schematic block diagram of one conventional controlling apparatus for controlling a DC/AC inverter coupled to a solar cell type power source.

In general, DC voltages derived from a solar cell are changed in response to amounts of solar energy given to this solar cell when deriving maximum power from the solar cell. As a consequence, a DC/AC inverter for such a solar cell type power source is controlled by changing the DC input voltage of this inverter in order that DC input power to this inverter becomes a maximum value, namely maximum DC power can be obtained from the solar cell type power source.

In the conventional control apparatus used for a solar cell type DC/AC inverter, a DC voltage derived from a solar cell 1 is applied to charge a capacitor 3 via a reverse current stopping diode 2, and also to a DC/AC inverter 4. An AC output from this DC/AC inverter 4 is connected to an AC power line via a filter constructed of a reactor 5 and a capacitor 6, whereby DC power generated by the solar cell 1 is inverted into AC power which will then be supplied to this AC power line.

In this case, the DC output power of the solar cell 1 is calculated by a multiplier 10 based upon both of a voltage detected by a voltage detector 8 and a current sensed by a current detector 9. A power control to increase and decrease a DC voltage command value is performed by a power control unit 11 in response to this DC output power from the solar cell 1 in accordance with an algorithm as shown in FIG. 2 in such a manner that this DC output power becomes maximum. This power control operation is repeated for a predetermined time period.

Upon commencement of such a power control, a judgement is performed whether the power is increased or decreased by comparing the latest power with the previous power, and then a decision is made that the present voltage command value is increased or decreased, depending upon an increase or a decrease in the preceding voltage command value. For instance, if the present power is increased at a step ST-21 (YES) and the preceding voltage command value is increased at a step ST-22 (YES), then the present voltage command value is increased at a step ST-23. To the contrary, if the present power is increased at the step ST-21 (YES) and the preceding voltage command value is not increased, namely equal to, or decreased, as compared with the present voltage command value at the step ST-22 (NO), then the present voltage command value is decreased at a step ST-25. Furthermore, when the present power is not increased at the step ST-21, the similar judgement is made of the preceding voltage command value at a further step ST-26 in this flow chart shown in FIG. 2. As a result, such a voltage command by which the DC output power from the solar cell 1 may become maximum, is issued.

Referring back to the circuit diagram shown in FIG. 1, a voltage control unit 12 compares this voltage command with the output voltage from the solar cell 1 to obtain a voltage deviation value, and outputs a current command to a current control unit 13 so as to reduce this voltage deviation value to zero. Thereafter, this current control unit 13 compares this current command with an AC current detected by a current detector 7 to obtain a current deviation value, and then performs the PWM (pulse width modulation) control of the DC/AC inverter 4 in order to reduce this current deviation value to zero.

It should be noted that although the current control unit 13 has such a function by which an AC current command is produced in synchronism with a voltage phase of the AC power line and the AC power line is driven at a power factor of 100%, since this function has no direct relationship with the present invention, no further explanation thereof is made in the following descriptions.

As previously explained, the above-described conventional inverter controlling apparatus intends to control the DC output power from the solar cell 1 at maximum values. However, there is a problem that the inverting efficiency of the DC/AC inverter 4 is varied in response to the DC input voltage thereof, and therefore the AC power derived from the DC/AC inverter 4 is not always supplied to the AC power line at its maximum efficiency, which AC power is supplied to the AC power line, or loads. In general, it is known that the higher, a DC input voltage of a PWM-controlled DC/AC inverter becomes, the lower, an inverting efficiency thereof becomes. As a consequence, a DC voltage "$V_1$" at which DC power "PDC" becomes maximum is not coincident with another DC voltage "$V_2$" at which AC power "$P_{AC}$" becomes maximum, as clearly represented in FIG. 3. In FIG. 3, the first DC voltage "$V_1$" is higher than the second DC voltage "$V_2$".

Moreover, there is another problem in the conventional power control algorithm as explained in FIG. 2. When the amounts of solar energy incident upon the solar cell 1 are changed, there are some dangerous conditions that the voltage command values are issued irrelevant to the maximum output power points. More specifically, as represented in FIG. 4, after the maximum power control is executed under such conditions that the output characteristic of the solar cell 1 is "$C_1$" and the output voltage thereof is "$V_1$", and the voltage command value is decreased, if the amount of solar energy incident upon the solar cell 1 is increased and then the output characteristics of this solar cell 1 are changed from $C_1$ to $C_2$ and $C_3$, the voltage command control is established along a direction of A-D-E, irrelevant to the maximum output points B and C. Subsequently, this voltage command control might be effected from the E point to the C point. It this case, some time delays may be produced until the maximum power control can be achieved.

The present invention has been made in an attempt to solve the above-described various problems, and therefore has an object to provide an DC/AC inverter controlling system used for a solar cell type power source, capable of increasing an efficiency of the overall controlling system, while supplying maximum AC power to an AC power line, or load, and furthermore capable of improving a follow-up (tracking) characteristic of the system when amounts of solar energy given to the solar cell type power source are changed. As a consequence, the maximum AC power can be continuously supplied from the DC/AC inverter to the AC power line.

SUMMARY OF THE INVENTION

To achieve is above-described object and other features of the present invention, a DC/AC inverter controlling system (1000) according to the present invention comprises:

DC/AC inverting means (4) for inverting DC (direct current) power derived from the solar cell power source (1) into AC (alternating current) power to be supplied to an AC power line;

power variation judging means (100A) for judging whether or not a variation measured during a predetermined time period and occurring in the AC power outputted from the DC/AC inverting means (4), exceeds a predetermined value ($\Delta P_{LIMIT}$), thereby producing a power variation judging signal; and power controlling means (100) for controlling the DC/AC inverting means (4) so as to reduce said power variation to substantially zero in response to said power variation judging signal, while said power variation does not exceed said predetermined value ($\Delta P_{LIMIT}$), whereby the AC power outputted from the DC/AC inverting means (4) becomes a maximum value thereof.

BRIEF DESCRIPTION OF THE DRAWINGS

For a better understanding of the present invention, reference is made of the following descriptions in conjunction with the accompanying drawings, in which.

DETAILED DESCRIPTION OF THE PREFERRED EMBODIMENTS

Basic Idea

Figure 5:
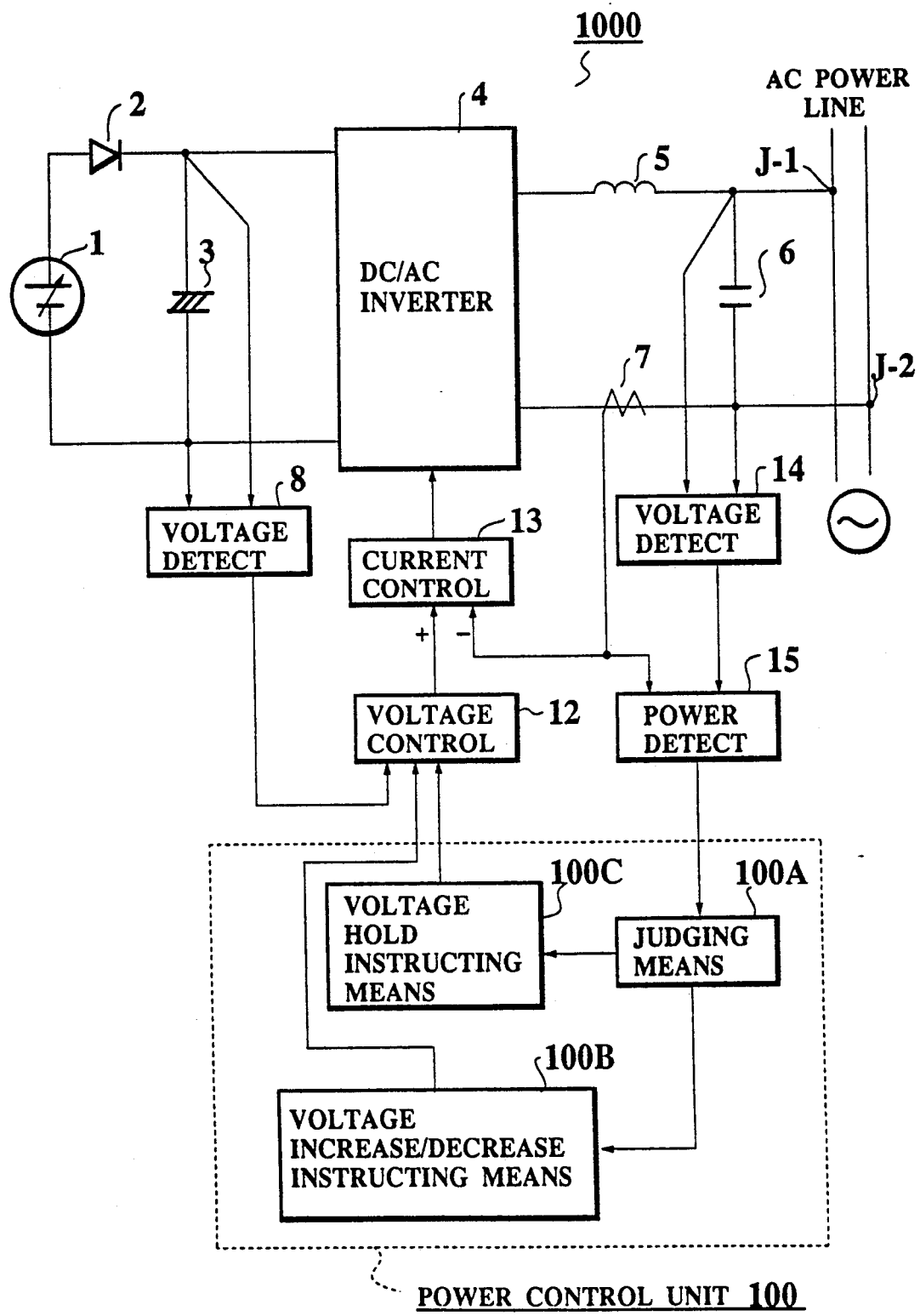
FIG. 5 is a schematic block diagram of an entire arrangement of a DC/AC inverter controlling system used for a solar cell type power source, according to a preferred embodiment of the present invention.

The DC/AC inverter controlling system used for a solar cell type power source, according to the present invention, is realized based upon the following basic idea (see FIG. 5).

The controlling system according to the basic idea of the present invention is to control a DC/AC inverter (4) by which DC power produced from a solar cell (1) is converted into AC power to be supplied to an AC power line. This inverter controlling system is mainly constructed of voltage control means (12) for controlling a current of the DC/AC inverter (4) in order to reduce a deviation value of the DC voltage outputted from the inverter (4) with respect to a voltage command; and power control means (100) for producing the voltage command to control the AC power outputted from the DC/AC inverter (4) at maximum values thereof, in response to an increased value/a decreased value of this AC output power.

In accordance with another aspect of the present invention, the above-described power controlling means (100) includes:

Judging means for judging whether or not the increased/decreased value of the AC output power exceeds a predetermined power value during a predetermined time period;

voltage command holding means for holding as a fixed value a voltage command issued when the increased/decreased values has exceeded a predetermined power value; and voltage command increasing/decreasing means for increasing/decreasing the voltage command in such a manner that the AC output power is set to a maximum value when the increased/decreased values are within the predetermined power value.

With the above-described basic construction of the present invention, the power control means (100) controls the DC voltage inputted to the DC/AC inverter (4) in such a manner that the maximum AC power can be supplied to the AC power line, or load, and controls that the conversion efficiency of the overall solar cell type power generating system becomes maximum.

Also, when the amount of solar energy given to the solar cell (1) is changed and thus, the changing amounts of the AC power outputted from the DC/AC inverter (4) exceed a predetermined power value, the above-described DC voltage is maintained at a constant value. On the other hand, when the amount of solar energy given to the solar cell (1) becomes stable, namely not greatly changed, and therefore the variation range of the AC output power is within a predetermined power value, the above-described maximum power control operation is commenced, whereby stable power control can be realized having good tracking characteristics.

Overall Arrangement of DC/AC Inverter Controlling System

In FIG. 5, there is shown an overall arrangement of a DC/AC inverter controlling system 1000 according to a preferred embodiment of the present invention, to which the above-described basic idea has been applied.

Figure 1:
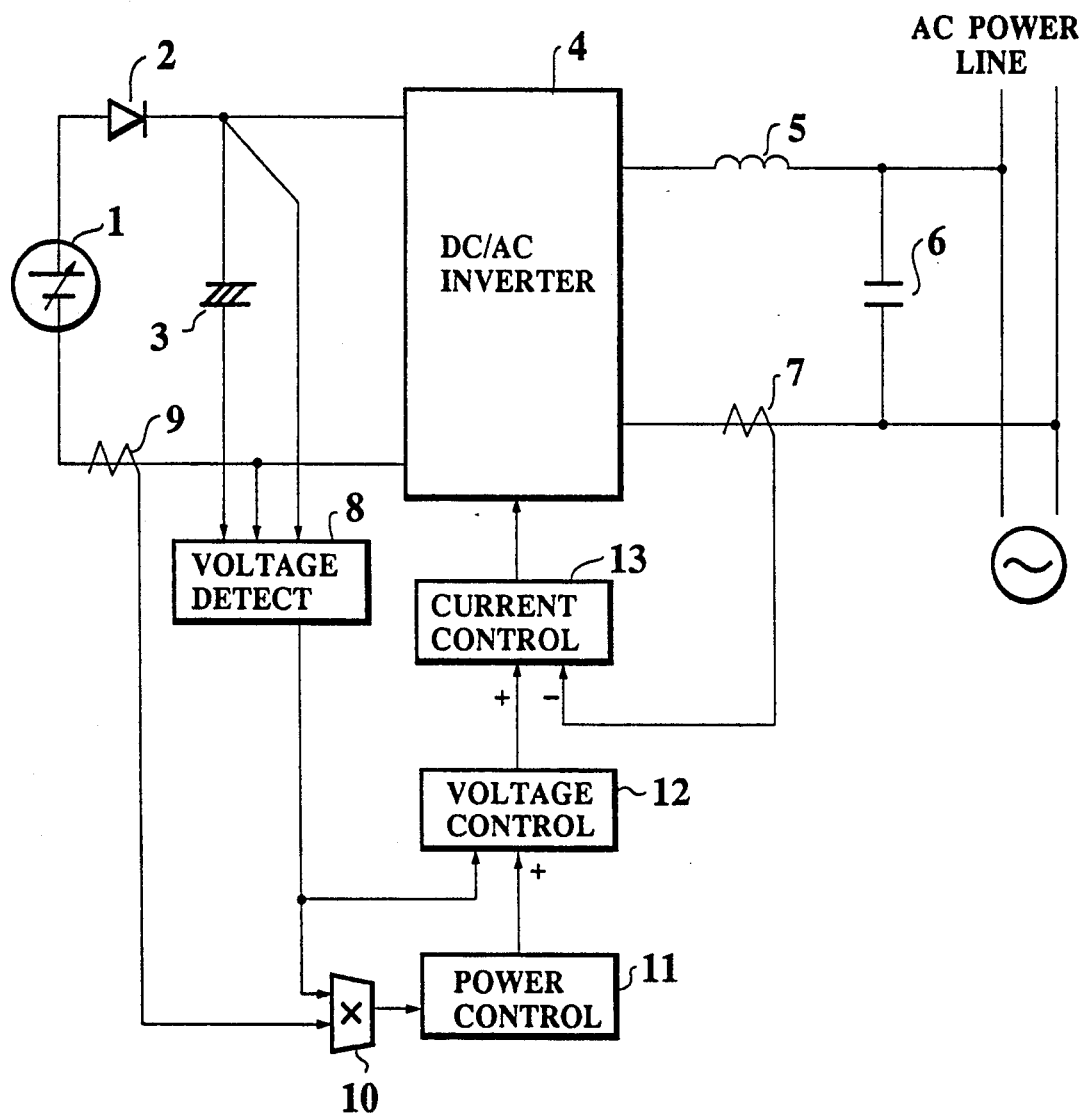
FIG. 1 is a schematic block diagram for showing the construction of, the conventional inverter controlling apparatus.
Figure 2:
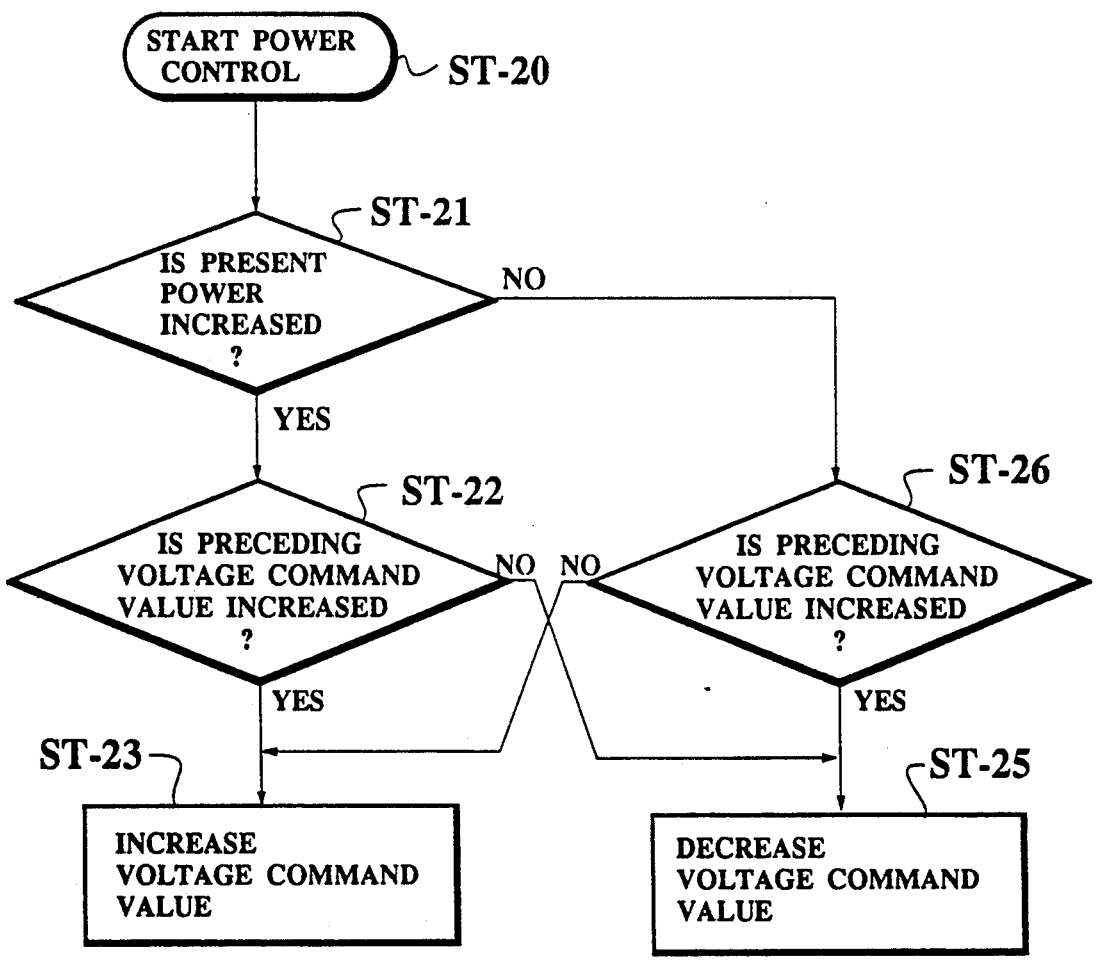
FIG. 2 is a flow chart for explaining the power control algorithm used in the controlling apparatus shown in FIG. 1.
Figure 3:
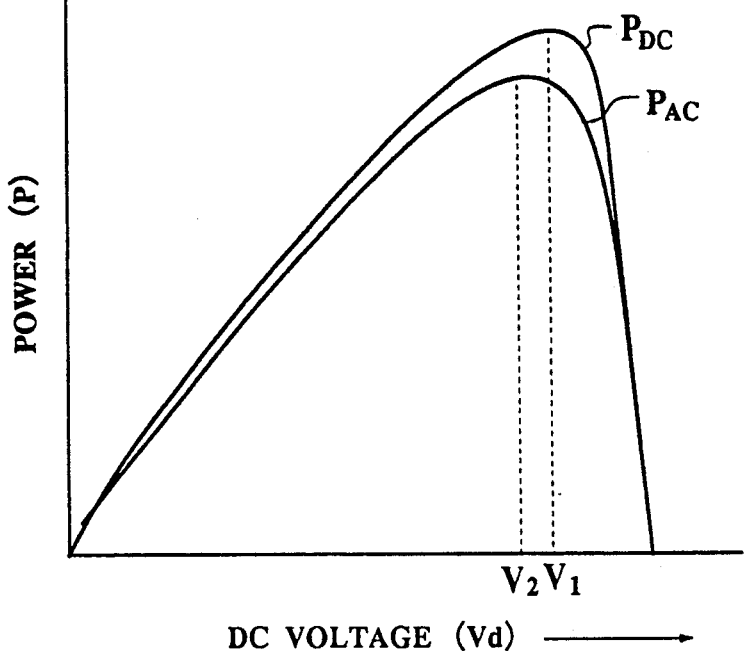
FIGS. 3 and 4 show the power control characteristics of the conventional controlling apparatus shown in FIG. 1.
Figure 4:
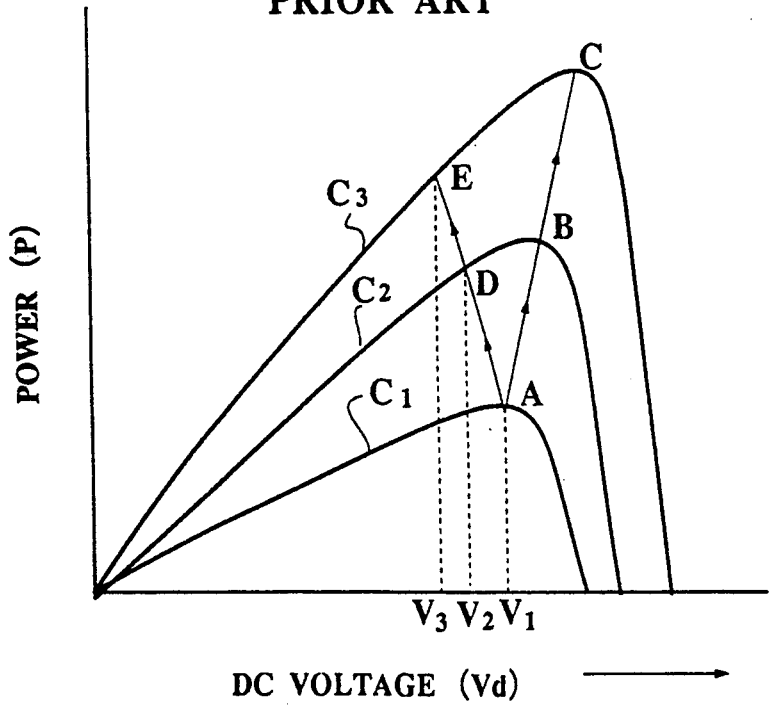

It should be noted that the same reference numerals shown in FIG. 1 will be employed as those for denoting the same or similar circuit elements, and explanations thereof are omitted. Furthermore, only circuit elements specific to this preferred embodiment will now be explained in the following description. In FIG. 5, a voltage detector 14 detects an AC voltage appearing at junction points J-1 and J-2 through which the AC power is supplied from the DC/AC inverter 4 via the reactor 5. Based upon this detected AC voltage and the AC current sensed by the current detector 7, AC power is calculated by a power detector 15 in accordance with the well known power calculating formula. If such an AC current control is carried out that the output current from the DC/AC inverter 4 is under in-phase condition with the AC voltage appearing at the junction points J-1 and J-2 (namely, AC voltage of the AC power line), since no reactive power is produced, AC instantaneous power values can be obtained by merely multiplying the AC current by the AC voltage, and then, desirable AC power can be obtained by averaging these instantaneous power values in a power detecting unit 15.

The DC/AC inverter controlling system 1000 further comprises a power control unit 100 functioning as a major circuit arrangement of this system 1000. The power control unit 100 includes, judging means 100A, voltage increase/decrease instructing means 100B and voltage hold instructing means 100C. The judging means 100A judges whether the voltage increase/decrease instructing means 100B or the voltage hold instructing means 100C is brought into an operative state in response to the power calculated by the power detecting unit 15. This judging operation is performed in accordance with a voltage control algorithm (will be described more in detail).

Power Control Algorithm

Figure 6:
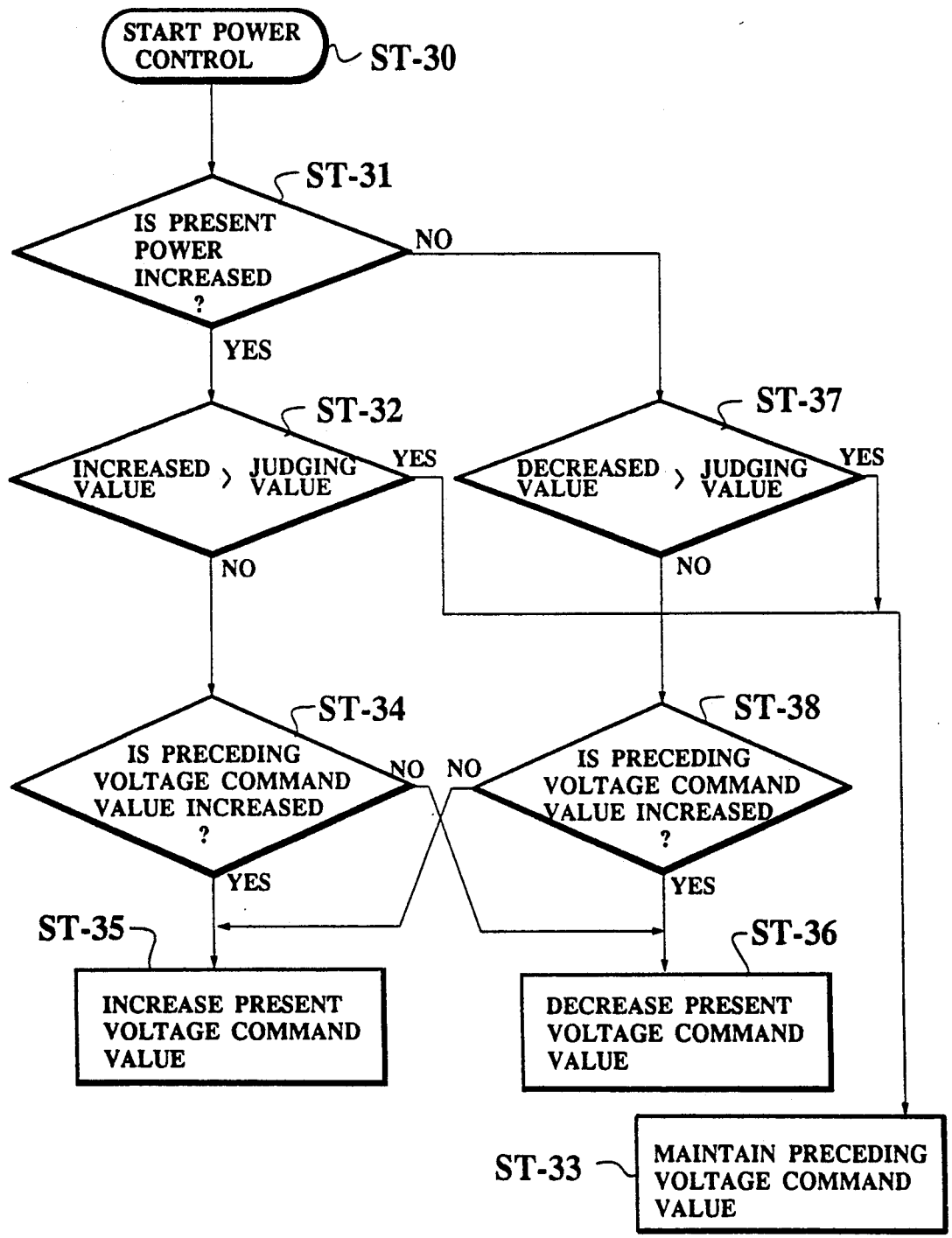
FIG. 6 is a flow chart for explaining a power control algorithm employed in the inverter controlling system of FIG. 3.

As previously explained, the power control unit 100 is operated in accordance with a power control algorithm as shown in FIG. 6. This power control algorithm is repeatedly performed at a constant time period.

In the power control algorithm shown in FIG. 6, a power control according to the present invention is commenced at a step ST-30. Subsequently, the presently measured AC power (namely, the latest AC power) is compared with the previously measured AC power (namely, preceding AC power) at a step ST-31. It should be noted that a time interval of the AC power measurement is selected from 2 seconds to 200 milliseconds in this preferred embodiment. If the latest AC power is increased ("YES" at step ST-31), another check is made at a step ST-32 whether or not an increased value exceeds a judging value. If the increased value of the latest AC power exceeds this judging value ("YES" at step ST-32), then the control process is advanced to a step ST-33 at which the preceding voltage command value is maintained. To the contrary, if this increased value does not exceed the judging value at the step ST-32 ("NO"), then a further check is performed at a step ST-34 whether or not the preceding voltage command value is increased. If the preceding voltage command value is increased ("YES" at step ST-34), then the control process is advanced to a step ST-35 at which the present voltage command value is increased. Conversely, if the preceding voltage command value is not increased ("NO" at step ST-34), then the control process is advanced to a step ST-36 at which the present voltage command value is decreased.

Returning back to the step ST-31, if the present power is not increased ("NO") at this step ST-31, then another check is made at a step ST-37 whether or not the decreased value of the present power exceeds a judging value. If the decreased value exceeds this judging value ("YES" at step ST-37), then the control process is advanced to the above-described step ST-33, whereby the present voltage command value is maintained. Conversely, if the decreased value does not exceed this judging value ("NO" at step ST-37), then a further check is done at a step ST-38 whether or not the preceding voltage command value is increased. If "YES", then the control process is advanced to the step ST-36 so that the present voltage command value is decreased. To the contrary, if "NO", then the control process is advanced to the step ST-35, whereby the present voltage command value is increased.

It should be noted that the above-described judging value is set to such a value sufficiently larger than AC power values which are increased, or decreased, depending upon the increased/decreased voltage command values under this power control, and therefore owns a function capable of practically judging variations in amounts of solar energy.

The above-explained power control algorithm of this preferred embodiment will now be summarized. That is, there are two major power control modes. In one power control mode, the DC/AC inverter 4 is controlled in order to continuously derive maximum AC output power until the variations between the latest AC power an the preceding AC power are present within a predetermined limit value. To the contrary, if the variations exceed this limit value, the drive voltage of this DC/AC inverter 4 is maintained at a preselected constant value, so that the AC power outputted from the DC/AC inverter 4 remains at a predetermined power value.

While amounts of solar energy given to the solar cell 1 are kept in a stable range, the AC power derived from the DC/AC inverter 4 is increased/decreased within the judging value, and therefore the DC voltages inputted into the DC/AC inverter 4 are controlled in such a manner that the maximum AC power can be continuously supplied to the AC power line. That is to say, since the inverting efficiency of the DC/AC inverter 4 is lowered when this DC input voltage becomes high, such a control is made that this DC input voltage is not so increased.

On the other hand, if amounts of solar energy are suddenly changed, and the increased/decreased power values exceed the judging value, the DC voltage inputted to the DC/AC inverter 4 is maintained at a constant value, and after the amounts of solar energy are brought into the stable conditions or range, the above-described maximum AC power control is commenced by controlling the DC voltage inputted to the DC/AC inverter 4.

Practical Circuit and Algorithm for DC/AC Inverter Controlling System

Figure 7:
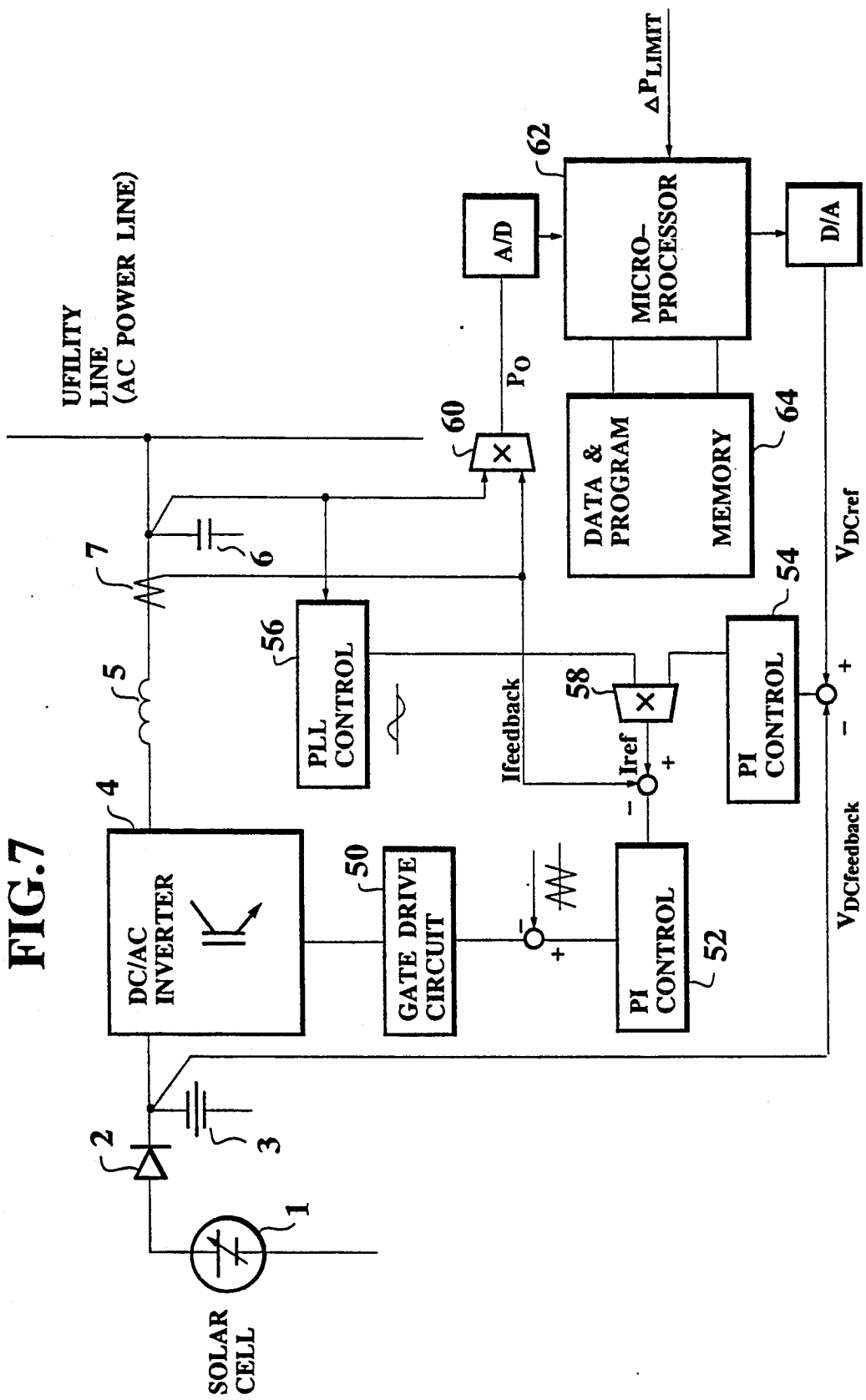
FIG. 7 is a circuit block diagram of a practical DC/AC inverter controlling system according to another preferred embodiment of the present invention.
Figure 8:
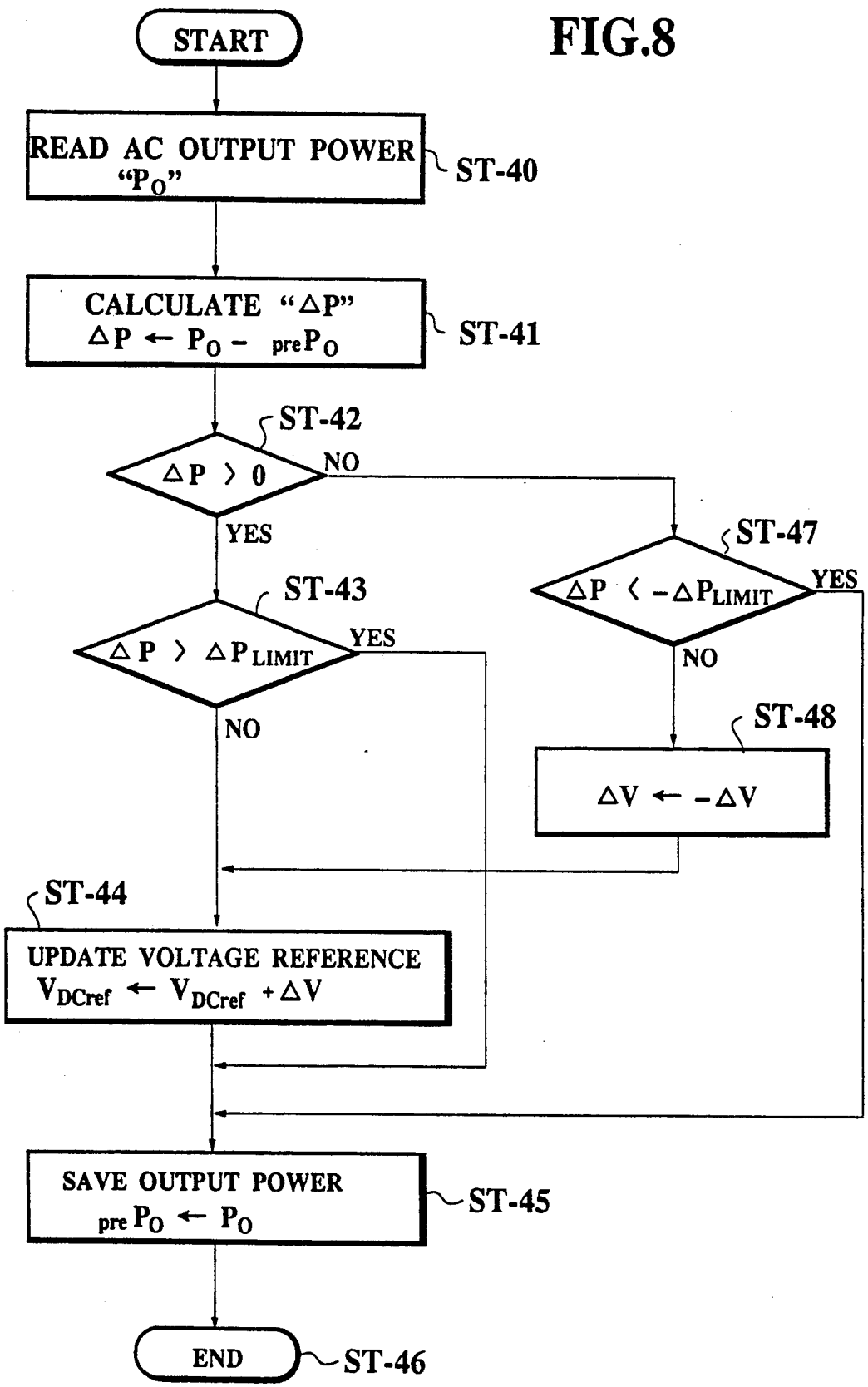
FIG. 8 is a flow chart for explaining a power control algorithm of the practical DC/AC inverter controlling system shown in FIG. 7.

FIG. 7 is a circuit block diagram for showing a practical circuit of the DC/AC inverter controlling system 1000 of FIG. 5. It should be noted that the same reference numerals shown in FIG. 6 denote the same, or similar circuit elements represented in FIG. 5. FIG. 8 is a flow chart for explaining an overall control process employed in this practical circuit of the DC/AC inverter controlling system 1000.

As shown in FIG. 7, the practical circuit of the DC/AC inverter controlling system 1000 is mainly constructed of a gate drive circuit 50, a first PI control circuit 52, a second PI control circuit 54, and a PLL (Phase-Locked Loop) control circuit 56, and a first multiplier 58. These circuit elements may mainly function as the above-described voltage control unit 12, current control unit 13. This practical circuit further comprises a second multiplier 60, a microprocessor 62 and a data/program memory 64. These circuit elements may essentially function as the power detecting circuit 15, and the power controlling unit 100 including the judging means 100A, the voltage increase/decrease instructing means 100B and the voltage hold instructing means 100C.

Referring now to the flow chart shown in FIG. 8, the overall control process of this practical circuit will be described.

At a first step ST-40, the present AC output power 30 "$P_0$" is read in the second multiplier 60. Thereafter, a difference "$\Delta P$" between the present AC power "$P_0$" and the preceding AC power "$_{pre}P_0$" is calculated at a step ST-41 by operating the data/program memory 64 under control of the microprocessor 62. Then, a check is done at a step ST-42 whether or not this power difference "$\Delta P$" is greater than 0. If "YES", then another check is made at a step ST-43 whether or not this power difference "$\Delta P$" is larger than one power limit value "$\Delta P_{LIMIT}$".

Normally, since no drastic change happens to occur in the amounts of solar energy given to the solar cell 1, this power difference "P" is larger than the predetermined power value "$P_{LIMIT}$" (namely, "NO" at step ST-43). Accordingly, the control process is advanced to a further step ST-44 at which a voltage reference value "$V_{DCref}$" is updated (see FIG. 8). Next, the AC output power of the DC/AC inverter 4 is saved at a step ST-45 by changing "$P_0$" into "$_{pre}P_0$". Thereafter, this power control is completed at a step ST-46.

On the other hand, if the power difference "P" is not greater than 0, namely equal to, or smaller than 0, ("NO" at step 42), a check is made at a step ST-47 whether or not this power difference "P" is smaller than the other power limit value "$-\Delta P_{LIMIT}$". Normally, since this power difference "P" is not smaller than the other power limit value "$-\Delta P_{LIMIT}$" ("NO" at step ST-47), the control process is advanced to the next step ST-48 at which a voltage difference "$-\Delta V$" is changed to another voltage difference "$\Delta V$". Thereafter, the control process is advanced to the step ST-44. To the contrary, if the power difference "$-\Delta P_{LIMIT}$" is not smaller than the other power limit value "$-\Delta P_{LIMIT}$" ("YES" at step ST-47), the control process is advanced to the step ST-45, at which the AC output power saving operation is executed.

The above-described power controlling operations are performed by operating the various control circuits 52, 54, 56, the gate drive circuit 50, and other relevant circuit elements under control of the microprocessor 62, while utilizing the data and program stored in the memory 64.

As previously described in detail, in the DC/AC inverter controlling system of the present invention, the power converting efficiency of the overall solar energy producing system including not only the DC/AC inverter but also solar cell can be controlled at its maximum value, while AC power is supplied to the AC utility line (load). Even if the amounts of solar energy drastically change with reference to the limit value, the DC voltage inputted to the DC/AC inverter is kept constant so as to prevent variations in the power point tracking operation.

What is claimed is:

1. A DC/AC inverter controlling system used in a solar cell power source, comprising:

DC/AC inverting means for inverting DC (direct current) power derived from the solar cell power source into AC (alternating current) power to be supplied to an AC power line;

power variation determining means for determining if a rate of change in the AC power outputted from the DC/AC inverting means exceeds a predetermined rate of change and outputting a power variation determining signal indicating if said rate of change in said AC power exceeds said predetermined rate of change; and power controlling means for controlling the DC/AC inverting means so as to reduce said rate of change in the AC power to substantially zero and to maximize the AC power outputted from the DC/AC inverting means, when said power variation determining signal does not indicate that said rate in change in said AC power exceeds said predetermined rate of change.

2. A DC/AC inverter controlling system as claimed in claim 1, wherein said power controlling means controls a driving current of said DC/AC inverting means.

3. A DC/AC inverter controlling system as claimed in claim 2, wherein said power controlling means performs a PWM (Pulse-Width Modulation) control for said DC/AC inverting means.

4. A DC/AC inverter controlling system as claimed in claim 1, wherein said power variation determining means determines said rate of change in the AC power by comparing a presently measured AC power value of said DC/AC inverting means with a previously measured AC power value.

5. A DC/AC inverter controlling system as claimed in claim 4, wherein said rate of change in the AC power is determined by measuring the AC power value from approximately every 2 seconds to every 200 milliseconds.

6. A DC/AC inverter controlling system as claimed in claim 1, wherein said power controlling means further includes:

voltage increase/decrease instructing means for producing one of a voltage increase instruction and a voltage decrease instruction based upon said determined rate of change in the AC power, and said DC/AC inverter controlling system further comprising:

drive controlling means for controlling a drive of said DC/AC inverting means in response to one of said voltage increase instruction and said voltage decrease instruction, whereby said DC/AC inverting means continuously outputs said maximum AC power thereof.

7. A DC/AC inverter controlling system as claimed in claim 6, wherein said drive controlling means is a gate drive circuit and said DC/AC inverting means includes a switching element having a gate electrode which is driven by said gate drive circuit in a PWM (Pulse-Width Modulation) control mode.

8. A DC/AC inverter controlling system as claimed in claim 1, wherein said power controlling means further controls a drive voltage of said DC/AC inverting means to be kept at a predetermined constant value, when said rate of change in the AC power exceeds said predetermined rate of change, and said power controlling means maintains the AC power output from said DC/AC inverting means at a preselected value.

9. A DC inverter controlling system as claimed in claim 1, wherein said power variation determining means determines if the rate of change in the AC power outputted from the DC/AC inverting means exceeds the predetermined rate of change by measuring the change in power outputted by the DC/AC inverting means.

* * * * *